United States Patent
Sokolov (10) Patent No.: US 9,558,574 B2
(45) Date of Patent: Jan. 31, 2017

(54) METHOD AND SYSTEM FOR CONFLATING RASTER AND VECTOR DATA

(75) Inventor: Serguei Sokolov, Manotick (CA)

(73) Assignee: AUTODESK, INC., San Rafael, CA (US)

( * ) Notice: Subject to any disclaimer, the term of this patent is extended or adjusted under 35 U.S.C. 154(b) by 121 days.

(21) Appl. No.: 13/400,502

(22) Filed: Feb. 20, 2012

(65) Prior Publication Data

US 2013/0215150 A1    Aug. 22, 2013

(51) Int. Cl.
*G09G 5/00*    (2006.01)
*G06T 11/60*    (2006.01)

(52) U.S. Cl.
CPC ........... *G06T 11/60* (2013.01); *G09G 2340/12* (2013.01)

(58) Field of Classification Search
None
See application file for complete search history.

(56) References Cited

U.S. PATENT DOCUMENTS

| | | | | |
|---|---|---|---|---|
| 2006/0041375 | A1* | 2/2006 | Witmer et al. | 701/208 |
| 2007/0014488 | A1* | 1/2007 | Chen et al. | 382/294 |
| 2007/0253642 | A1* | 11/2007 | Berrill et al. | 382/305 |
| 2011/0276592 | A1* | 11/2011 | Gautama et al. | 707/769 |
| 2012/0075337 | A1* | 3/2012 | Rasmussen et al. | 345/629 |

\* cited by examiner

*Primary Examiner* — James A Thompson
*Assistant Examiner* — Xilin Guo
(74) *Attorney, Agent, or Firm* — Artegis Law Group, LLP (57) ABSTRACT

Embodiments of the present invention provide for accurate relative location information to be preserved between vector and raster data sources during non-linear transformation. In a method according to an embodiment of the present invention, raster and vector data are received that corresponds to maps and conflated in a multi-step process. Objects of at least one of vector data are identified and conflated. For example, in an embodiment of the present invention, vertices of vector objects are identified. In a subsequent step, raster data is conflated by applying a non-linear transformation to the raster data using identified vertices of vector data from before and after conflation as control points. The resulting hybrid map is output that is advantageously accurate in general but is further advantageously accurate at critical points.

22 Claims, 8 Drawing Sheets

METHOD AND SYSTEM FOR CONFLATING RASTER AND VECTOR DATA

BACKGROUND OF THE INVENTION

1. Field of the Invention

Embodiments of the present invention generally relate to computer graphics and, more specifically, to techniques for conflating raster and vector data.

2. Description of the Related Art

Conventional digital images are generally represented in either vector or raster formats. Raster graphics, also called bitmap graphics, consist of a sequence of data representing a generally rectangular grid of picture elements, called pixels. Raster graphics generally correspond pixel-for-pixel with a displayed or printed representation of the content. Because raster graphics are discrete, they generally do not scale well.

Raster formats are used to store arrays of pixel color values, the color values specifying a color for each pixel location within a rectangular array of pixels. Raster images are generally resolution dependent, and the information in a raster image file only suffices to identify color values for a fixed resolution. Raster images can be scaled down in size by down-sampling such as by averaging, and scaled up by up-sampling such as by interpolation. However, up-sampled color values in general are artificial, and often destroy the true nature of an image. Familiar examples of raster images include image images acquired by a digital camera or scanner.

Vector graphics, on the other hand, are represented by description, rather than by listing a value for each pixel in a graphic. Geometric shapes can be represented as a vector graphic, and an arbitrary shape may be represented by a combination of such geometric shapes. For instance, a straight-line segment can be described as a vector graphic by describing its two endpoints, or by its slope, length, and origin. Likewise, a circle can be described in vector representation by describing its radius and center point. Accordingly, vector graphics are sometimes referred to as geometric data since they define objects by description rather than as a sequence of pixels. Because vector graphics are continuous, they can scale well. Familiar examples of vector images include flowcharts, block diagrams and other synthetic images produced by graphics software applications.

Image compositing involves generation of complex images by overlaying simpler images on top of one another. For example, a composite image may include a layer for a background, layers for various sprites, and a layer for text. Layers are generally arranged one on top of another. One of the many challenges of image compositing is the overlaying of raster and vector images. Since vector images are generally resolution independent, conventional digital compositing systems scale a vector image to the pixel dimensions of a raster image, when overlaying one upon the other.

Many organizations, e.g., utilities such as electric, gas, and telecom utilities, maintain data in what are sometimes call hybrid maps that are a composite image of raster and vector information resulting from a conflation process. For example, raster maps include scanned maps and/or raster-ized results of vector maps. Vector maps may include maps with facilities or landbase features that are represented as vector graphics layers. The hybrid maps, therefore, contain overlapping data from both types of maps. It has been observed, however, that current methods of conflating such hybrid maps result in inaccuracies that can present hazards for field operations. For example, it is an undesirable result to visually misrepresent connections of electric conductors in a hybrid map. Indeed, such a misrepresented connection can result in costly errors and may present safety issues.

As the foregoing illustrates, there is a need in the art for a robust and practical approach for aligning raster and vector data across varying environments.

SUMMARY OF THE INVENTION

In embodiments of the present invention, accurate relative location information is preserved between vector and raster data sources during non-linear transformation. In a method according to an embodiment of the present invention, raster and vector data are received that corresponds to maps. A first set of control points is identified form the inputted raster or vector data. The vector data is conflated using this first set of control points. A second set of control points is then identified from the conflated vector data. Then, the raster data is conflated using this second set of control points. A hybrid map is output that is advantageously accurate in general but is further advantageously accurate at critical points where raster and vector data must be aligned, for example.

In an embodiment, features of at least one of raster or vector data are identified as control points. For example, in an embodiment of the present invention, vertices of vector objects are identified. This may be desirable in utility applications because it has been observed that substantially all physical connections of utility important objects occur at vertices of vector objects.

In an embodiment, the present invention allows for automatic creation of a large set of control points from vertices of transformed vector objects. Because many more control points are used in embodiments of the present invention, the resulting hybrid map is assured to be accurate at more points relative to conventional approaches. Also, where vertices of vector objects are used as control points because they may correspond to critical connection points, the disclosed technique allows such critical connection points to be at correct locations.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
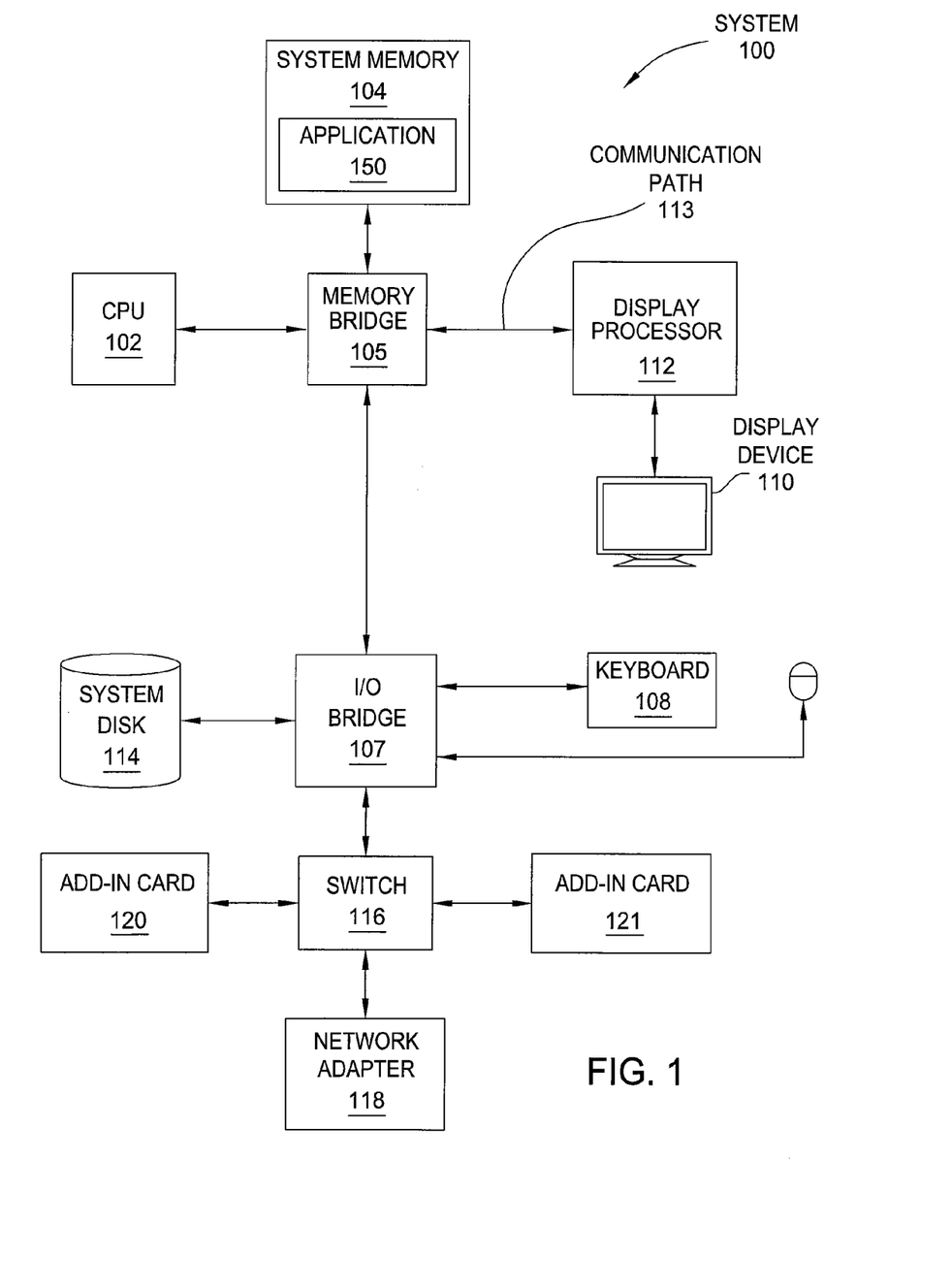
FIG. 1 is a block diagram of a computer system on which certain embodiments of the present invention can be implemented.

Among other things, the present invention relates to methods, techniques, and algorithms that are intended to be implemented in a digital computer system. By way of overview that is not intended to be limiting, digital computer system 100 as shown in FIG. 1 will be described. Such a digital computer or embedded device is well-known in the art and may include variations of the below-described system.

FIG. 1 is a block diagram of a system 100 configured to implement one or more aspects of the present invention. System 100 may be a computer workstation, personal computer, or any other device suitable for practicing one or more embodiments of the present invention. As shown, system 100 includes one or more processing units, such as central processing unit (CPU) 102, and a system memory 104 communicating via a bus path that may include a memory bridge 105. CPU 102 includes one or more processing cores, and, in operation; CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices such as keyboard 108 or mouse 109 and forwards the input to CPU 102 via memory bridge 105. In alternative embodiments, I/O bridge 107 may also be connected to other input devices such as a joystick, digitizer tablets, touch pads, touch screens, still or video cameras, motion sensors, and/or microphones (not shown).

One or more display processors, such as display processor 112, are coupled to memory bridge 105 via a bus or other communication path 113 (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104. Display processor 112 periodically delivers pixels to a display device 110 that may be any conventional CRT or LED monitor. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or a graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

In one embodiment, application 150 is stored in system memory 104. Application 150 may be any application configured to display a graphical user interface (GUI) on display device 110. Application 150 may be configured to generate and modify documents based on input received from a user. For example, application 150 may be a word processing application or an image editing program.

It will be appreciated that the system shown herein is illustrative and that variations and modifications are possible. The connection topology, including the number and arrangement of bridges, may be modified as desired. For instance, in some embodiments, system memory 104 may be connected to CPU 102 directly rather than through a bridge, and other devices may communicate with system memory 104 via memory bridge 105 and CPU 102. In other alternative topologies display processor 112 may be connected to I/O bridge 107 or directly to CPU 102, rather than to memory bridge 105. In still other embodiments, I/O bridge 107 and memory bridge 105 may be integrated in a single chip. In addition, the particular components shown herein are optional. For instance, any number of add-in cards or peripheral devices might be supported. In some embodiments, switch 116 is eliminated, and network adapter 118 and add-in cards 120, 121 connect directly to I/O bridge 107.

We turn now to a discussion of raster and vector maps as used in embodiments of the present invention.

In certain conflation applications, all data is either in vector or raster formats, but not mixed. In such situations, conventional data transformation techniques generally produce adequate results. For example, Autodesk has developed non-linear transformation tools for AutoCAD Map 3D and Raster Design products. Both tools generally produce consistent as-designed results when data is in only one format but may produce less desirable results when applied to mixed data types.

In using both raster and vector maps such as in the use of hybrid maps, it is important for raster and vector maps for the same territory to correctly overlap (e.g., maintain relative position of corresponding features depicted on both layers). For example, where in the real world, a conductor is connected to a switch, it is desirable that a conductor in the raster data visually appear to be connected to a switch symbol rendered as pixels in the vector layer when two data layers are overlaid.

A misalignment problem may arise, however, when an attempt is made to apply a non-linear transformation to overlapping raster and vector layers. This is, for example, required when facilities conflate existing maps to a new landbase. Such a conflation process may use a set of control points and complex rubber-sheeting algorithms to complete the transformation. In such an application, control points define locations of predetermined objects in the source and the target maps. Whereas the location of such predetermined objects are known and fixed, a problem may arise for the location of objects away from the predetermined objects.

A problem can be that, due to differences in data types (e.g., raster or vector data), transformational algorithms produce results that may not be aligned exactly as in the source maps before the conflation. Although variations in calculated locations of connected objects between raster and vector data sources are relatively small and within predefined mathematical accuracy of the transformation method, for example, the produced results may not be acceptable for certain applications. FIGS. 2-5 will be used to illustrate this issue.

Figure 2:
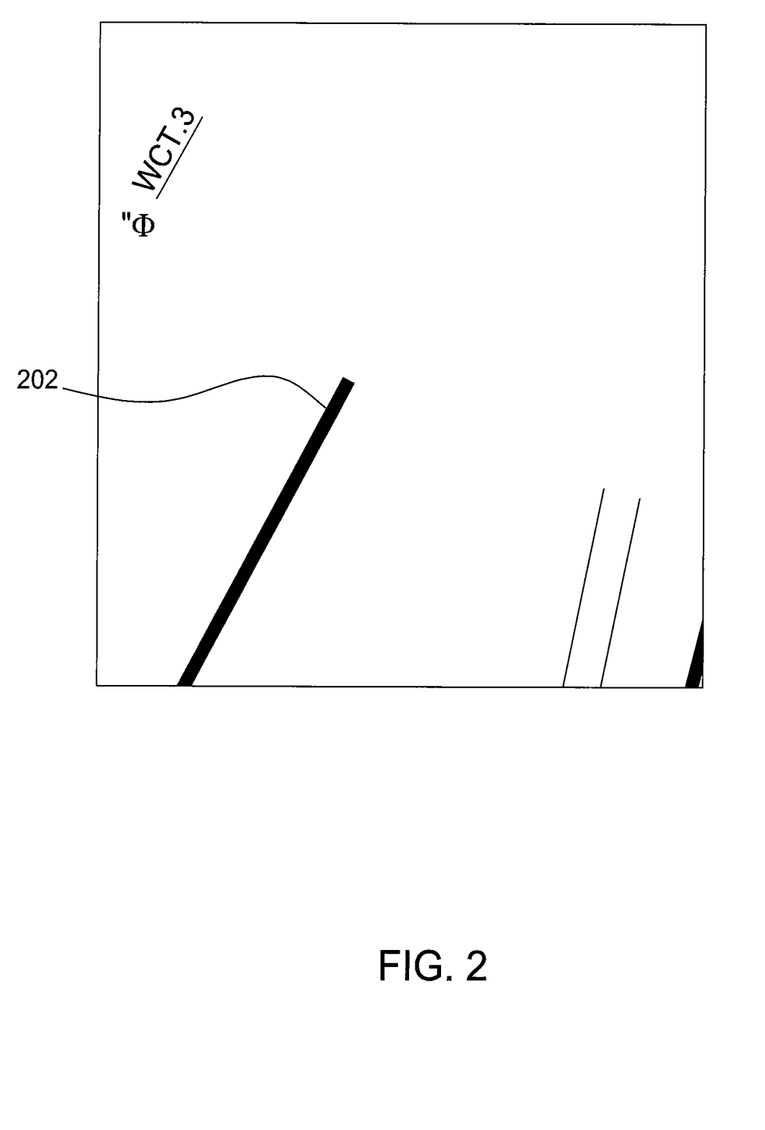
FIG. 2 shows data from a conventional raster map.
Figure 3:
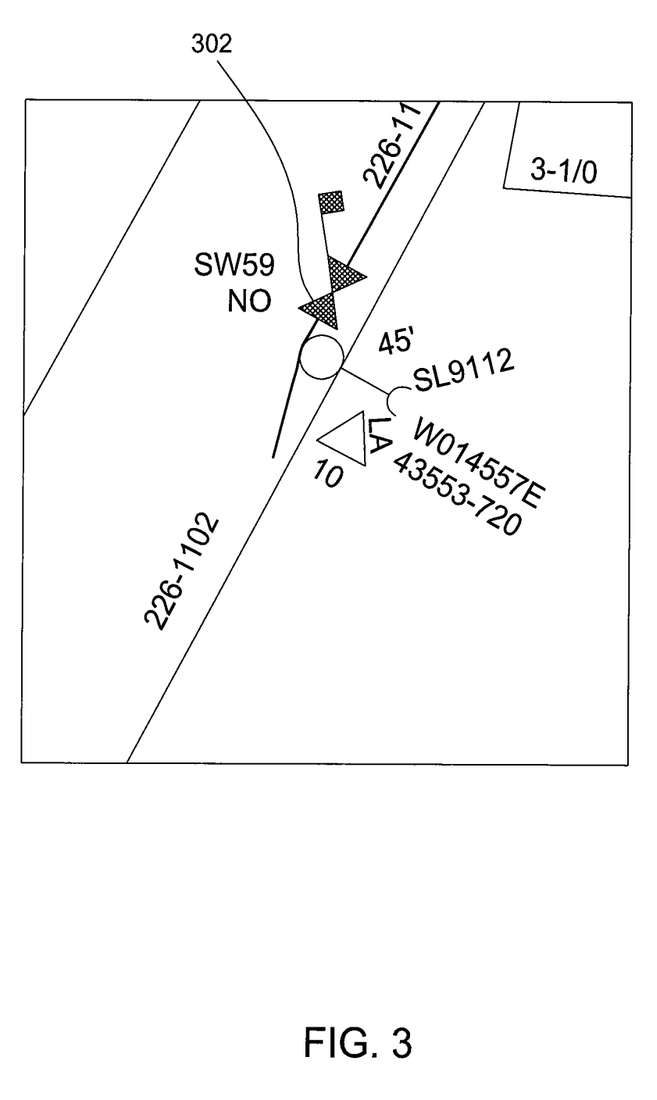
FIG. 3 shows data from a conventional vector map.
Figure 4:
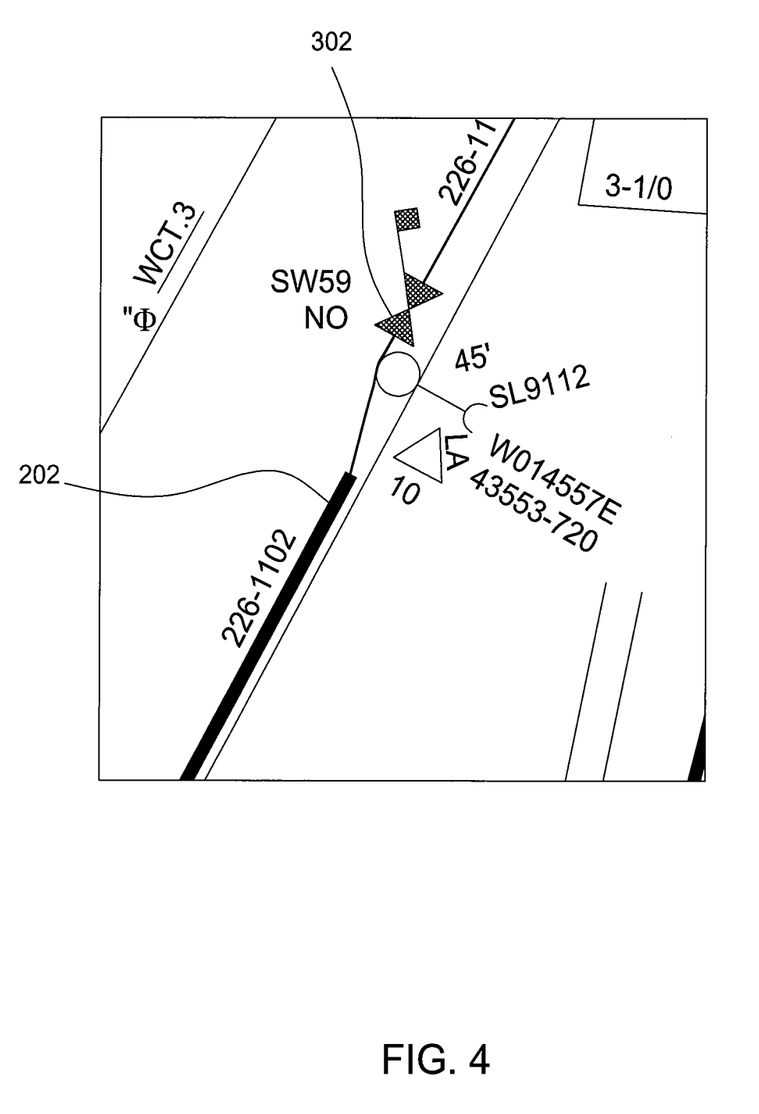
FIG. 4 shows a conventional raster map overlaid on a conventional vector map.

Shown in FIG. 2 is certain information from a raster map. Among other things, conductor 202 is shown as lying in at particular locations. Shown in FIG. 3 is certain information from a vector map. Among other things, switch 302 is shown as lying at a particular location. Shown in FIG. 4 is an overlay of the raster map of FIG. 2 on the vector map of FIG. 3 that correctly visually shows, among other things, that conductor 202 is connected to switch 302.

In order to make use of the raster and vector maps representing objects overlaid with a new landbase, however, organizations such as utilities conflate hybrid maps. In such a conflation, a limited set of control points is manually or automatically identified from the raster or vector maps. The positions of such control points are then used in a non-linear transformation that conflates the raster and vector maps using the same set of identified control points. In conventional applications, the control points can be limited in number where, in a typical application, the set of control points may be five or fewer. Indeed, in certain applications, the control points may be limited to the four corners of the given maps. Among other things, the non-linear transformation assures that the control points are maintained at a fixed position such that, after application of the non-linear transformation, the control points remain at the same position.

Figure 5:
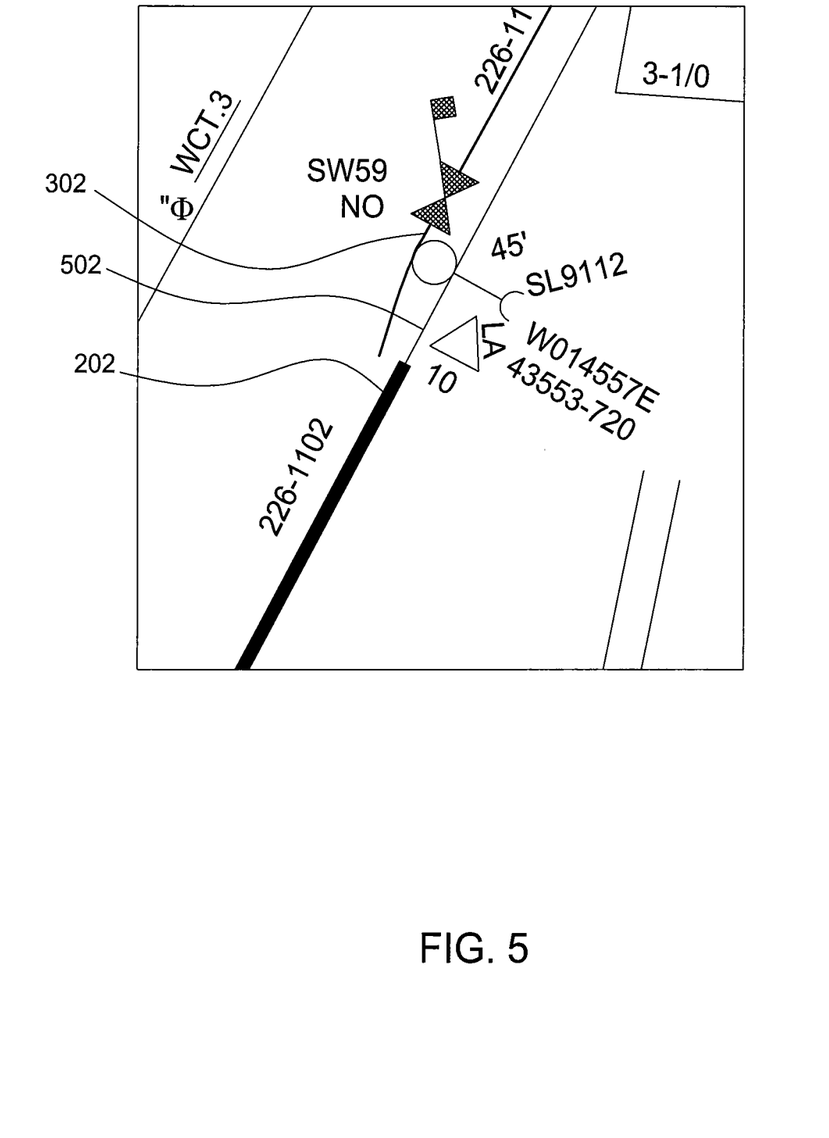
FIG. 5 shows the result of a conventional conflation method that includes inaccuracies.

Undesirably, however, map positions away from the control points are not assured to have a correct correlation between the raster and vector maps. In fact, it has been observed that positions away from the control points may deviate significantly in a hybrid map that is the result of a conflation of the raster and vector maps. For example, shown in FIG. 5, is the result of the application of conventional conflation methods to the raster map of FIG. 2 and the vector map of FIG. 3. As shown, for example, conductor 202 is not visually connected to switch 302. Instead, conductor 202 is shown to be connected to conductor 502, which is an incorrect result (compare to FIG. 3).

It has been found that changing transformation parameters or algorithms may improve results in some case, but there can be no guarantee of consistent results for every application even if exactly the same set of control points is used for conflation. This may be unacceptable in certain business applications because an inconsistent result may impact safety and reliability of certain operations, for example in utility applications. Conventional methods for the conflation of raster and vector data, therefore, may fail to produce consistent and satisfactory results for hybrid maps.

Figure 6:
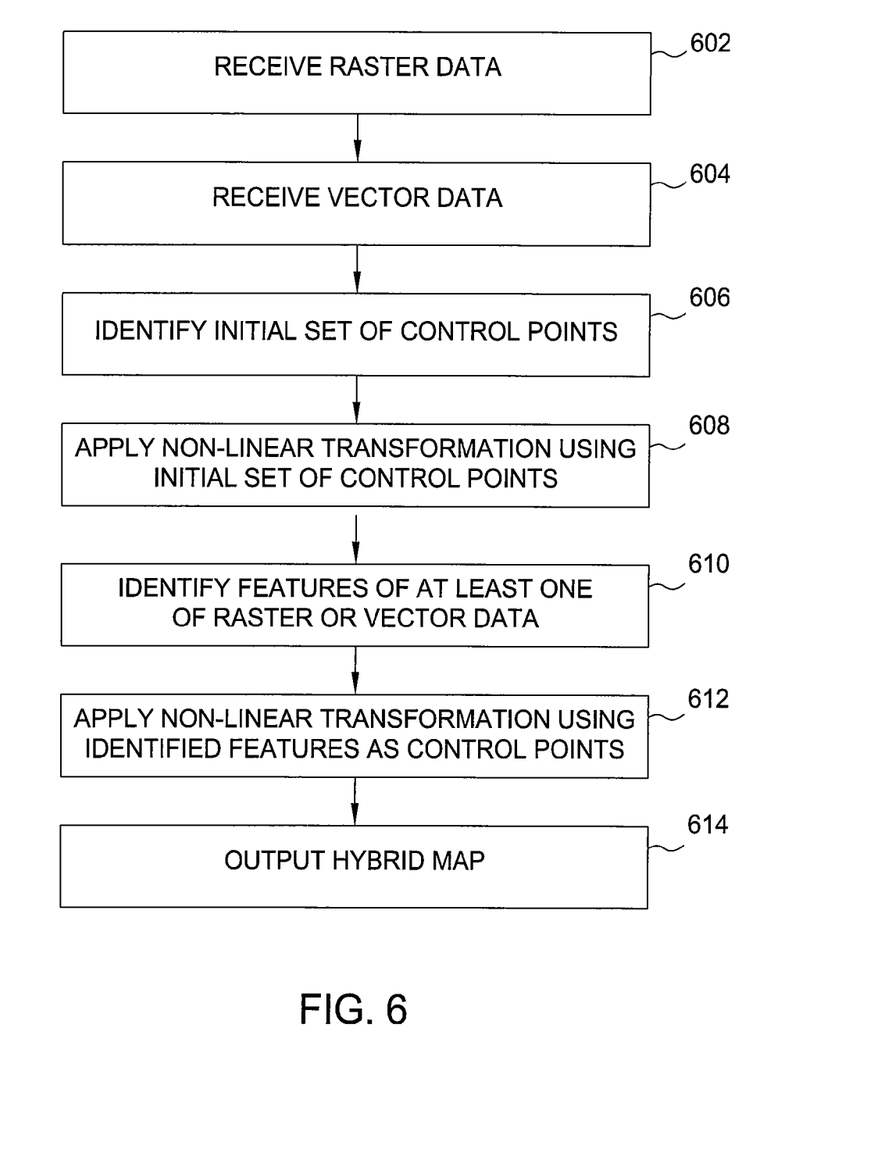
FIG. 6 is a flowchart for a method according to an embodiment of the present invention for using personas to generate simulated schedules.

Advantageously, embodiments of the present invention maintain accurate relative position of raster and vector objects and generally provide consistent results. For example, in a situation where a raster object is visually connected to a vector object before a non-linear transformation, such visual representation will be maintained after the non-liner transformation is applied. An embodiment of the present invention as shown in the flowchart of FIG. 6 addresses these issues by implementing a multi-step conflation process that resolves the issue of misalignment of raster and vector objects and provides improved consistent results of the non-linear transformation. Those of ordinary skill in the art, however, will understand that the scope of the present invention is in no way limited by the disclosed examples. For example, embodiments of the present invention may implement steps of the disclosed methods in a different order.

As shown at step 602, a method according to an embodiment of the present invention receives raster data. In an embodiment, such raster data corresponds to certain rasterized or scanned maps used by utilities. In another embodiment, such raster data may include maps as used by surveying companies.

At step 604, a method according to an embodiment of the present invention receives vector data. In an embodiment, such vector data corresponds to certain vector maps used by utilities. For example, such vector maps may be the output of certain computerized design tools. In another embodiment, such vector data may include maps as used by surveying companies.

At step 606, a method according to an embodiment of the present invention identifies an initial set of control points. With the initial set of control points, vector data is conflated by applying a non-linear transformation as shown in step 608.

Figure 7:
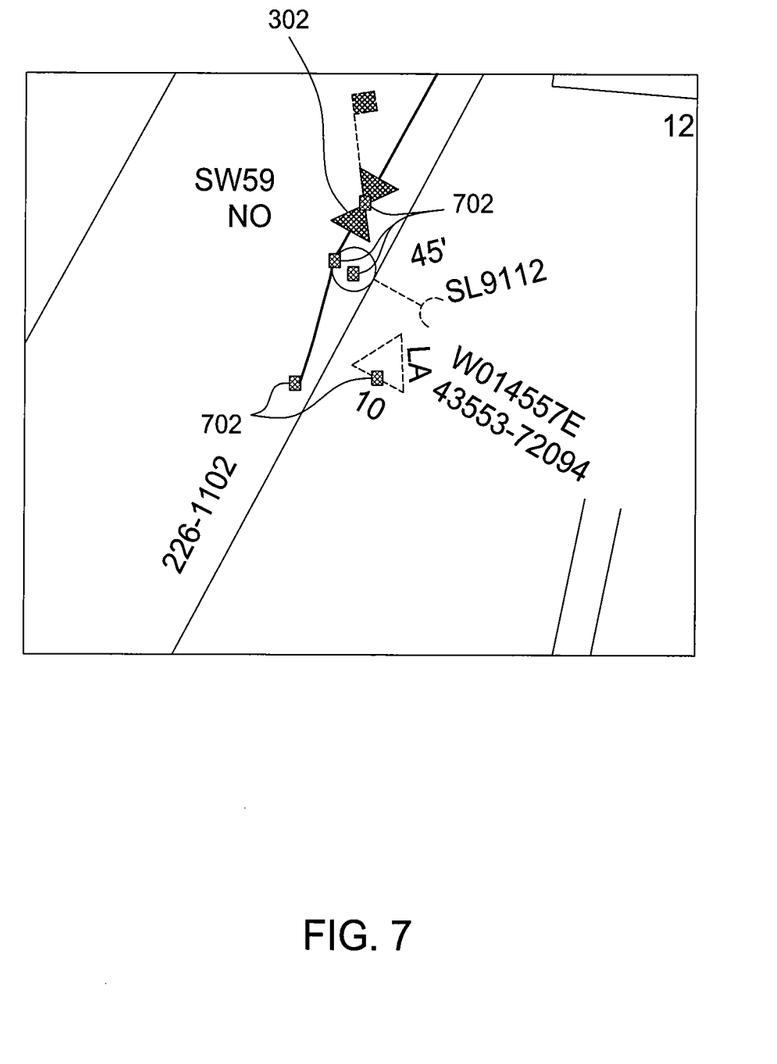
FIG. 7 shows the identification of features on a vector map according to an embodiment of the present invention.

At step 610, features of at least one of raster or vector data are identified and a new set of control points is created from vertices of conflated vector objects. For example, as shown in FIG. 7, in an embodiment of the present invention, vertices 702 of vector objects are identified. Note that for illustrative purposes, only a limited number of vertices 702 are shown. In actual application, many more vertices would likely result from the vector data conflation.

In utility applications, the use of vertices from vector data before and after non-linear transformation that is automatically identified as the new set of control points is desirable because it has been observed that substantially all physical connections of utility-important objects occur at vertices of vector objects. In another embodiment of the present invention, features from the raster data may be used. For example, endpoints of a continuation of pixels may be used. In yet another embodiment, features from both the raster and vector data are identified.

At step 612, the raster data is conflated by applying a non-linear transformation to the raster data using the identified vertices of vector data before and after conflation as control points. Such non-linear transformation can be the same as those used in conventional conflation methods. For example, appropriate algorithms include Rubber Sheeting as defined in the AutoCAD Map 3D tool or any other non-linear transformation algorithm. At step 610, the resulting hybrid map is output.

Figure 8:
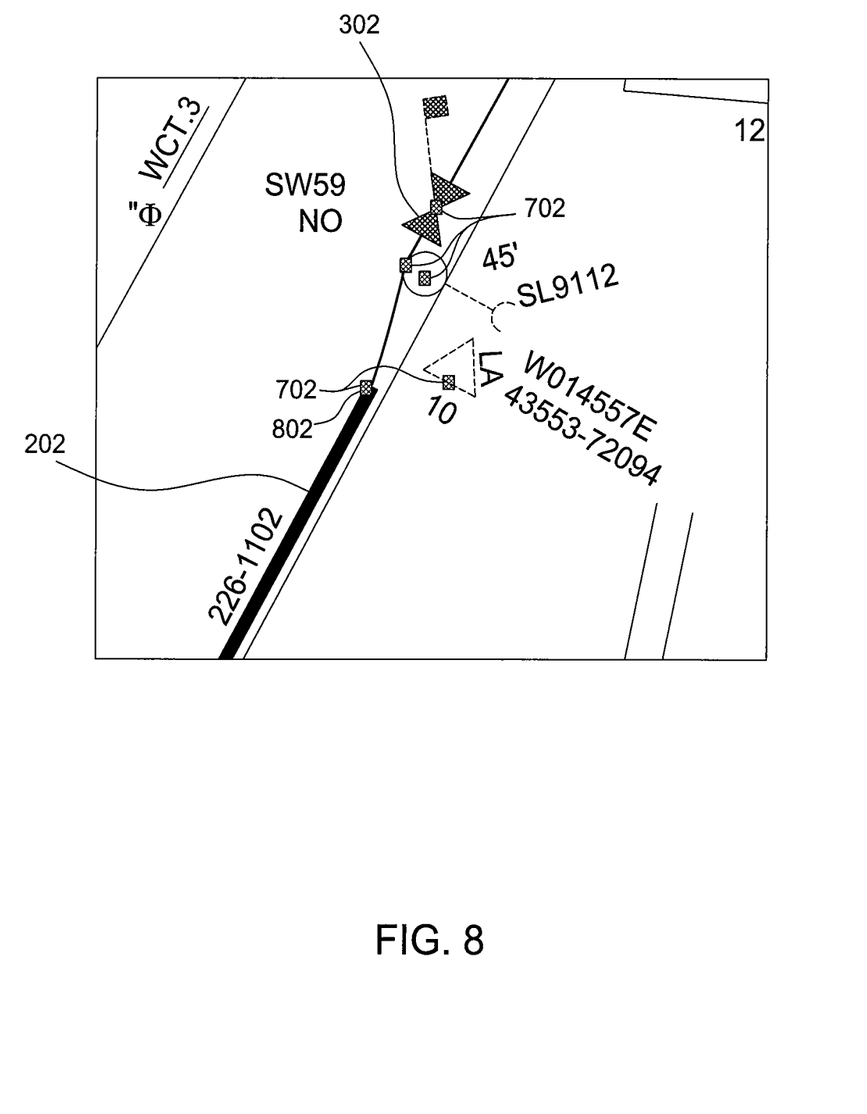
FIG. 8 shows the results of a method according to an embodiment of the present invention.

Importantly, because many more control points are used, the resulting hybrid map is assured to be accurate at more points on the hybrid map. For example, where vertices of vector objects are used as control points, the method of FIG. 6 assures that such vertices are fixed at the correct location at the vertices of the vector objects. For example, as shown in FIG. 8, where the vertices of the vector objects of FIG. 7 were identified as control points in an embodiment of the present invention, the hybrid map visually shows the correct connection of conductor 202 with switch 302 at location 802. As shown in FIG. 8, after the transformation, all raster objects are fixed and accurately aligned with vector objects at the control points which were the vertices 702 of vector objects.

The present invention does not rely on a manual identification of control points for the described conflation and can, therefore, be automated and implemented in software. For example, embodiments of the present invention automatically identify a large set of features such as vector features. In an embodiment, all vertices before and after the described conflation can be used as control points for non-linear transformation of raster data that leads to an improved hybrid map with accurate locations for the various features.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

The present invention is not limited to the described examples. Indeed, the present invention finds many applications. For example, a geographic information system (GIS) is a system for archiving, retrieving, and manipulating data that has been stored and indexed according to the geographic coordinates of its elements. A classic problem for geographic information systems is the registration of misaligned vector data and raster data, the vector data typically representing road information and the raster data typically representing aerial imagery. Accordingly, the present invention can be used in such applications to provide improved geographic information.

While the foregoing is directed to embodiments of the present invention, other and further embodiments of the invention may be devised without departing from the basic scope thereof, and the scope thereof is determined by the claims that follow.

The invention claimed is:

1. A computer-implemented method for generating improved mapping information, the method comprising:
   receiving raster data corresponding to a first mapped area;
   receiving vector data wherein at least a portion of the vector data corresponds to the first mapped area;
   identifying a first set of control points from the raster data and the vector data;
   conflating the vector data with a first conflation process based on the first set of control points to produce conflated vector data;
   identifying a second set of control points comprising vertices of vector objects included in the vector data and vertices of vector objects included in the conflated vector data;
   conflating the raster data with a second conflation process based on the second set of control points comprising vertices of vector objects included in the vector data before and after the vector data is conflated; and
   generating hybrid data from the conflated raster data and vector data.

2. The method of claim 1, wherein conflating the raster data is based on a non-linear transformation.

3. The method of claim 1, wherein at least a first portion of the second set of control points corresponds to connection points of objects included in at least one of the raster data or the vector data.

4. The method of claim 1, wherein one or more locations of the second set of control points are fixed in the hybrid data.

5. The method of claim 1, wherein one or more locations of the second set of control points are substantially the same in the hybrid data and the vector data.

6. The method of claim 1, wherein one or more locations of second set of control points are substantially the same in the hybrid data and the raster data.

7. The method of claim 1, wherein one or more locations of the second set of control points are substantially the same in the hybrid data, the raster data, and the vector data.

8. The method of claim 1, wherein the vector data comprises a vector map.

9. The method of claim 1, wherein the raster data comprises a raster map.

10. A non-transitory computer-readable medium including instructions that, when executed by a processing unit, cause the processing unit to generate hybrid data, by performing the steps of:
- receiving raster data corresponding to a first mapped area;
- receiving vector data wherein at least a portion of the vector data corresponds to the first mapped area;
- identifying a first set of control points from the raster data and the vector data;
- conflating the vector data with a first conflation process based on the first set of control points to produce conflated vector data;
- identifying a second set of control points comprising vertices of vector objects included in the vector data and vertices of vector objects included in the conflated vector data;
- conflating the raster data with a second conflation process based on the second set of control points comprising vertices of vector objects included in the vector data before and after the vector data is conflated; and
- generating hybrid data from the conflated raster data and vector data.

11. The non-transitory computer-readable medium of claim 10, wherein conflating the raster data is based on a non-linear transformation.

12. The non-transitory computer-readable medium of claim 10, wherein at least a first portion of the second set of control points corresponds to connection points of objects included in at least one of the raster data or the vector data.

13. The non-transitory computer-readable medium of claim 10, wherein one or more locations of the second set of control points are fixed in the hybrid data.

14. The non-transitory computer-readable medium of claim 10, wherein one or more locations of the second set of control points are substantially the same in the hybrid data and the vector data.

15. The non-transitory computer-readable medium of claim 10, wherein one or more locations of second set of control points are substantially the same in the hybrid data and the raster data.

16. The non-transitory computer-readable medium of claim 10, wherein one or more locations of the second set of control points are substantially the same in the hybrid data, the raster data, and the vector data.

17. The non-transitory computer-readable medium of claim 10, wherein the vector data comprises a vector map.

18. The non-transitory computer-readable medium of claim 10, wherein the raster data comprises a raster map.

19. A computing device comprising:
- a data bus;
- a memory unit coupled to the data bus;
- a processing unit coupled to the data bus and configured to
  - receive raster data corresponding to a first mapped area;
  - receive vector data wherein at least a portion of the vector data corresponds to the first mapped area;
  - identify a first set of control points from the raster data and the vector data;
  - conflate the vector data with a first conflation process based on the first set of control points to produce conflated vector data;
  - identify a second set of control points comprising vertices of vector objects included in the vector data and vertices of vector objects included in the conflated vector data;
  - conflate the raster data with a second conflation process based on the second set of control points comprising vertices of vector objects included in the vector data before and after the vector data is conflated; and
  - generate hybrid data from the conflated raster data and vector data.

20. The computing device of claim 19, wherein the memory includes instructions that, when executed by the processing unit, cause the processing unit to perform the recited steps.

21. The method of claim 1, wherein conflating the vector data is based on a non-linear transformation; and the control points included in the second set of control points comprise vertices of vector objects in the vector data before and after non-linear transformation.

22. The method of claim 1, wherein the hybrid data comprises raster objects that are aligned with vector objects at control points comprising the vertices of vector objects.

* * * * *